(12) United States Patent
Huffman et al.

(10) Patent No.: US 6,718,442 B1
(45) Date of Patent: Apr. 6, 2004

(54) METHOD AND SYSTEM FOR USING HIGH COUNT INVALIDATE ACKNOWLEDGEMENTS IN DISTRIBUTED SHARED MEMORY SYSTEMS

(75) Inventors: William A. Huffman, Los Gatos, CA (US); Jeffrey S. Kuskin, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 342 days.

(21) Appl. No.: 09/910,274

(22) Filed: Jul. 20, 2001

Related U.S. Application Data (60) Provisional application No. 60/219,952, filed on Jul. 20, 2000.

(51) Int. Cl.[7] .............................................. G06F 12/00
(52) U.S. Cl. ........................ 711/141; 711/144; 711/120
(58) Field of Search ................................ 711/141, 120, 711/144

(56) References Cited

U.S. PATENT DOCUMENTS

| | | | | |
|---|---|---|---|---|
| 5,634,110 A | * | 5/1997 | Laudon et al. ............. | 711/145 |
| 5,935,230 A | * | 8/1999 | Pinai et al. ................ | 710/111 |
| 6,339,812 B1 | * | 1/2002 | McCracken et al. ........ | 711/141 |
| 6,421,712 B1 | * | 7/2002 | Koren ........................ | 709/213 |
| 6,598,120 B1 | * | 7/2003 | Berg et al. ................. | 711/121 |
| 6,622,217 B2 | * | 9/2003 | Gharachorloo et al. ..... | 711/141 |
| 6,633,958 B1 | * | 10/2003 | Passint et al. .............. | 711/141 |

OTHER PUBLICATIONS

Heinrich et al. "A Quantitative Analysis of the Performance and Scalability of Distributed Shared Memory Cache Coherence Protocols", Feb. 1999 IEEE Transactions on Computers.*

* cited by examiner

*Primary Examiner*—Mano Padmanabhan
*Assistant Examiner*—Paul Baker
(74) *Attorney, Agent, or Firm*—Baker Botts L.L.P.

(57) ABSTRACT

A multiprocessor computer system includes a method and system of handling invalidation requests to a plurality of alias processors not sharing a line of memory in a computer system. A memory directory interface unit receives an invalidation request for a shared line of memory shared in a plurality of sharing processors. A superset of processors in the computer system that includes each of the sharing processors is determined that includes at least one alias processor not sharing the shared line of memory. An invalidation message is transmitted to each processor in the superset of processors. The number $N_a$ of alias processors in the superset of processors is determined and a superacknowledgement message is provided that is equivalent to acknowledging receipt of $N_a$ invalidation messages.

16 Claims, 5 Drawing Sheets

| | 120 | 120 | 120 | 120 | 120 | 120 | 120 | 120 | 120 | 120 | 120 | 120 | 120 | 120 | 120 | 120 |
|---|---|---|---|---|---|---|---|---|---|---|---|---|---|---|---|---|
| TOP | 0 | 1 | 2 | 3 | 4 | 5 | 6 | 7 | 8 | 9 | A | B | C | D | E | F |
| 0 | 00 | 01 | 02 | 03 | 04 | 05 | 06 | 07 | 08 | 09 | 0A | 0B | 0C | 0D | 0E | 0F |
| 1 | 10 | 11 | 12 | 13 | 14 | 15 | 16 | 17 | 18 | 19 | 1A | 1B | 1C | 1D | 1E | 1F |
| 2 | 20 | 21 | 22 | 23 | 24 | 25 | 26 | 27 | 28 | 29 | 2A | 2B | 2C | 2D | 2E | 2F |
| 3 | 30 | 31 | 32 | 33 | 34 | 35 | 36 | 37 | 38 | 39 | 3A | 3B | 3C | 3D | 3E | 3F |
| 4 | 40 | 41 | 42 | 43 | 44 | 45 | 46 | 47 | 48 | 49 | 4A | 4B | 4C | 4D | 4E | 4F |
| 5 | 50 | 51 | 52 | 53 | 54 | 55 | 56 | 57 | 58 | 59 | 5A | 5B | 5C | 5D | 5E | 5F |
| 6 | 60 | 61 | 62 | 63 | 64 | 65 | 66 | 67 | 68 | 69 | 6A | 6B | 6C | 6D | 6E | 6F |
| 7 | 70 | 71 | 72 | 73 | 74 | 75 | 76 | 77 | 78 | 79 | 7A | 7B | 7C | 7D | 7E | 7F |
| BOT | 0 | 1 | 2 | 3 | 4 | 5 | 6 | 7 | 8 | 9 | A | B | C | D | E | F |
| 0 | 80 | 81 | 82 | 83 | 84 | 85 | 86 | 87 | 88 | 89 | 8A | 8B | 8C | 8D | 8E | 8F |
| 1 | 90 | 91 | 92 | 93 | 94 | 95 | 96 | 97 | 98 | 99 | 9A | 9B | 9C | 9D | 9E | 9F |
| 2 | A0 | A1 | A2 | A3 | A4 | A5 | A6 | A7 | A8 | A9 | AA | AB | AC | AD | AE | AF |
| 3 | B0 | B1 | B2 | B3 | B4 | B5 | B6 | B7 | B8 | B9 | BA | BB | BC | BD | BE | BF |
| 4 | C0 | C1 | C2 | C3 | C4 | C5 | C6 | C7 | C8 | C9 | CA | CB | CC | CD | CE | CF |
| 5 | D0 | D1 | D2 | D3 | D4 | D5 | D6 | D7 | D8 | D9 | DA | DB | DC | DD | DE | DF |
| 6 | E0 | E1 | E2 | E3 | E4 | E5 | E6 | E7 | E8 | E9 | EA | EB | EC | ED | EE | EF |
| 7 | F0 | F1 | F2 | F3 | F4 | F5 | F6 | F7 | F8 | F9 | FA | FB | FC | FD | FE | FF |

*FIG. 7*

METHOD AND SYSTEM FOR USING HIGH COUNT INVALIDATE ACKNOWLEDGEMENTS IN DISTRIBUTED SHARED MEMORY SYSTEMS

RELATED APPLICATIONS

This application claims the benefit of U.S. Provisional Application Ser. No. 60/219,952 filed Jul. 20, 2000.

TECHNICAL FIELD OF THE INVENTION

The present invention relates in general to multi-processor computer system operation and more particularly to a method and system for using high count invalidate acknowledgements in distributed shared memory systems.

BACKGROUND OF THE INVENTION

In a shared-memory multiprocessor computer system with per-processor caches, it is desirable for hardware to keep the caches coherent. This means that when one or more processors have a copy of a block or line of memory and one of the processors performs a write to that line, the cached copies must either be updated or invalidated.

Computer systems use memory directories that are associated with main memory. In large systems, memory, and thus the directories, may be physically distributed throughout the system. The directory associated with a region of memory keeps track of which processors, if any, have copies of memory lines in that region. When a write occurs to a line, the directory is consulted, and updates or invalidates are sent to any processors that have a copy of the line.

A large computer system is conventionally implemented with a large number of processors accessed through node controllers at node locations. The node controllers include the memory directories employing coarse directory protocols. A basic problem with memory directories is that the required storage does not scale well. Coarse directory protocols provide a technique that represents each processor in the computer system by saving space in the memory directory. Space is saved by grouping node controllers and associated processors that share information in memory. When it becomes necessary to invalidate all nodes with a shared copy of a cache line, invalidate commands are sent to all of the nodes within a group that includes the node that contains the shared copy of the memory. Typically, each node processes the invalidation command and sends an acknowledgment message back to the node that originated the invalidation command. Since full operation of the computer system does not continue until all expected acknowledgment messages are received, each node in a group must be present and operational for the computer system to work effectively. However, there may be situations where certain nodes of a group may not be present, may be in a failure state or simply may not share the line.

One way to reduce directory overhead is to limit the size of the directory entries such that an entry cannot represent any arbitrary set of processors in the system. The system is then either prohibited from allowing non-representable sets of processors to cache a line concurrently (by, say, invalidating the copies of certain processors when other processors obtain a copy of the line), or, more preferably, when a non-representable set of sharing processors occurs, the directory entry is set to represent some superset of the sharing processors. Then when the line is written, an invalidation or update message is sent to the superset of processors caching the line.

A goal of a directory structure for a large multiprocessor system is to use a modest number of bits in a directory entry, yet minimize the number of "spurious" invalidation messages that must be sent when a line is written. That is, keep the superset as close to the size of the actual set of sharers as possible.

At one end of the spectrum is a full broadcast mechanism. In this scheme, as soon as a line becomes cached by any processor (or perhaps only when it is cached by more than one processor), the state of the corresponding directory is set to indicate that a broadcast is necessary. When the line is written, invalidations are sent to all processors in the system. This mechanism minimizes the number of bits needed in the directory entry, but maximizes spurious invalidations.

At the other end of the spectrum is the full bit-vector mechanism described above, in which a directory entry includes a bit for each processor in the system. This maximizes directory storage overhead, but eliminates spurious invalidations. The storage overhead for this scheme is unacceptable for large systems.

A reasonable middle ground is a "coarse-vector" directory structure like the one used in the Origin 2000 manufactured by Silicon Graphics In. of Mountain View, Calif. The directory structure in the Origin 2000 includes a bit vector of size v in the directory entries (where v=32). Each bit represents one or more processor nodes in the system. For systems with thirty-two or fewer nodes, this size bit vector acts like a full bit vector. For larger numbers of nodes, however, the vector can become "coarse". When the set of processor nodes sharing a line is contained within an aligned block of consecutive processor nodes, then the bit vector can still be used as a full bit vector, with another small field in the directory entry specifying the block of processor nodes the vector represents. Processor nodes will typically contain one or more processors. In the Origin 2000, each processor node includes two processors.

When the set of processor nodes expands beyond an aligned block of v processor nodes, however, the meaning of the bits in the vector is changed (this is recorded in the state information in the entry). For N-processor-node systems, each bit in the vector now represents N/v processor nodes. For example, in a 512-processor node system with a 32-bit vector, each bit in the vector represents sixteen processor nodes. For every processor node caching the line, the bit representing the set of processor nodes containing that processor node would be set. When the line is written, for each bit that is set in the coarse vector, invalidation messages are sent to the corresponding set of N/v processor nodes. In most cases, this will cause invalidations to be sent to some processor nodes that do not have a copy of the line (spurious invalidates).

Another way of compacting directory entries, in contrast to the single bit vector approach discussed above, is a multi-dimensional directory structure approach which uses two or more bit vectors to track each processor node. Such an approach is described in U.S. patent application Ser. No. 08/971,184, filed Nov. 17, 1997, now pending, entitled Multi-Dimensional Cache Coherence Directory Structure, the entire disclosure of which is incorporated herein by reference. In the multi-dimensional approach, each processor node is represented by a bit in each of the two or more bit vectors.

For example, for a system with n vectors as each processor obtains a copy of a shared line, the bits corresponding to that processor are set in each of the n vectors of the associated directory entry. If n−1 of the vectors have only a single bit set, then the pointer information remains exact. If more than one bit is set in at least two of the fields, however, then the pointer information can become inexact, or approximate. As a result, in addition to invalidation messages being sent to shared processor nodes reading the messages, spurious invalidation messages are sent to alias processor nodes (i.e., processors the system initially interprets as sharing a line of memory that in reality do not share the line and indeed may not even exist) not needing the messages. As the number of alias processor nodes increases, determining the actual processors needing the invalidation messages becomes more cumbersome.

Typical computer systems merely allowed the problem of sending invalidation messages to non-existent nodes to occur or simply wasted directory space to handle the problem. Therefore, it is desirable to provide a technique to process invalidation commands for nodes with alias processors.

One method of handling invalidation requests to processors not present or operational in a computer system is described in U.S. patent application Ser. No. 09/410,139, filed Sep. 30, 1999, now pending, entitled Method and Apparatus for Handling Invalidation Requests to Processors Not Present in a Computer System, the entire disclosure of which is incorporated by reference herein. The method disclosed in U.S. application Ser. No. 09/410,139 includes receiving an invalidation request and identities of processors affected by the invalidation request. A determination is made as to which processors are currently present in the computer system and which processors are currently not present in the computer system. Invalidation messages are generated and transferred to processors determined to be present in the computer system. Acknowledgment messages are returned from processors that received and processed their respective invalidation message. Acknowledgment messages are generated and returned for those processors determined not to be present in the computer system. However, as the format of the sharing vectors becomes more complex and the number of alias processors increases, it becomes overly difficult to convert into a count the invalidation messages necessary in the same time that other directory calculations are taking place.

SUMMARY OF THE INVENTION

From the foregoing, it may be appreciated that a need has arisen for a technique to handle invalidation requests to processors that do not share the line being invalidated. In accordance with the present invention, a method and system for handling invalidation requests to alias processors not sharing the line are provided that substantially eliminate or reduce disadvantages and problems associated with conventional computer system operation.

According to an embodiment of the present invention there is provided a multiprocessor computer system that includes a method and system of handling invalidation requests to a plurality of alias processors not sharing a line of memory in a computer system. Invalidation herein means and includes invalidation and updating and thus the present invention as claimed includes invalidate-based coherence protocols as well as update-based protocols. A memory directory interface unit receives an invalidation request for a shared line of memory shared in a plurality of sharing processors. A superset of processors in the computer system that includes each of the sharing processors is determined that includes at least one alias processor not sharing the shared line of memory. An invalidation message is transmitted to each processor in the superset of processors. The number $N_a$ of alias processors in the superset of processors is determined and a superacknowledgement message is provided that is equivalent to acknowledging receipt of $N_a$ invalidation messages. A number of messages may make up the superacknowledgement message used to acknowledge receipt of the $N_a$ invalidation messages. In the sense that the alias processors never actually receive the invalidation messages, the superacknowledgement message simulates acknowledgement.

In an aspect of the present invention, the computer system is designed to include a maximum number M of processors and the number of processors in the superset of processors is less than M. The requester receives an acknowledgement message from each of the sharing processors.

In a further aspect of the present invention, the number $N_a$ of alias processors in the superset of processors is determined subsequent to transmitting an invalidation message to each processor in the superset of processors.

In another aspect of the present invention, at least two-bit vectors (i.e., at least a pair of bit-vectors) are used to represent processors in a vector matrix in which identification of at least two of the sharing processors in the vector matrix causes the identification of at least one of the alias processors in the vector matrix and wherein the superset of processors is determined to be the sharing processors and alias processor identified in the vector matrix.

In another aspect of the present invention, a system for handling invalidation requests to a plurality of alias processors not sharing a line of memory is provided that includes a memory directory interface unit operable to control access to and data manipulation for a memory and a processor interface unit operable to generate an invalidation request in response to data manipulation in the memory. The processor interface unit is operable to provide the invalidation request to the memory directory interface unit. The memory directory interface unit is operable to indicate a superset of processors in the computer system that may be affected by the invalidation request and subsequently identify the number of alias processors included in the superset of processors. The memory directory interface unit is also operable to generate a superacknowledgement message acknowledging receipt of the number of invalidation messages transmitted to alias processors included in the superset of processors.

In a further aspect of the present invention, a local block unit is operable to generate an invalidation message for the superset of processors. The local block unit transfers the invalidation messages to their respective processors, the processor interface unit operable to receive acknowledgment messages from the processors sharing the line of memory in response to processing of the associated invalidation message. The local block unit transfers the acknowledgment messages to the processor interface unit.

In yet another aspect of the present invention, at least two bit vectors are used to represent processors in a vector matrix in which identification of at least two of the sharing processors in the vector matrix causes the identification of at least one of the alias processors in the vector matrix. The system is configured to set the superset of processors as the sharing processors and alias processor identified in the vector matrix.

In a further aspect of the present invention, the bit vectors include a 2-bit vector, an 8-bit vector and a 16-bit vector defined by an 8-bit field operable to access 256 processor nodes identified in the vector matrix.

In another aspect of the present invention, the system is configured to include a maximum number M of processors and the system is configured to set the number of processors in the superset of processors to be less than M.

In another aspect of the present invention, the alias processors include phantom processors, i.e., the processor identified in the vector matrix either does not exist or is not operable.

Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
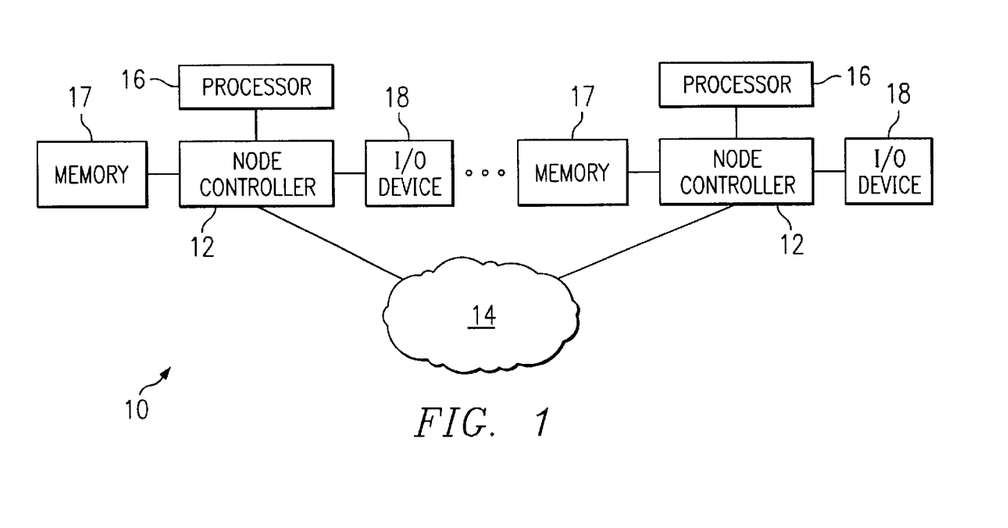
FIG. 1 illustrates a block diagram of a computer system.

FIG. 1 is a block diagram of a computer system 10. The computer system 10 includes a plurality of node controllers 12 interconnected by a network 14. Each node controller 12 processes data and traffic both internally and with other node controllers 12 within the computer system 10 over the network 14. Each node controller 12 may communicate with one or more local processors 16, a local memory device 17, and a local input/output device 18.

Figure 2:
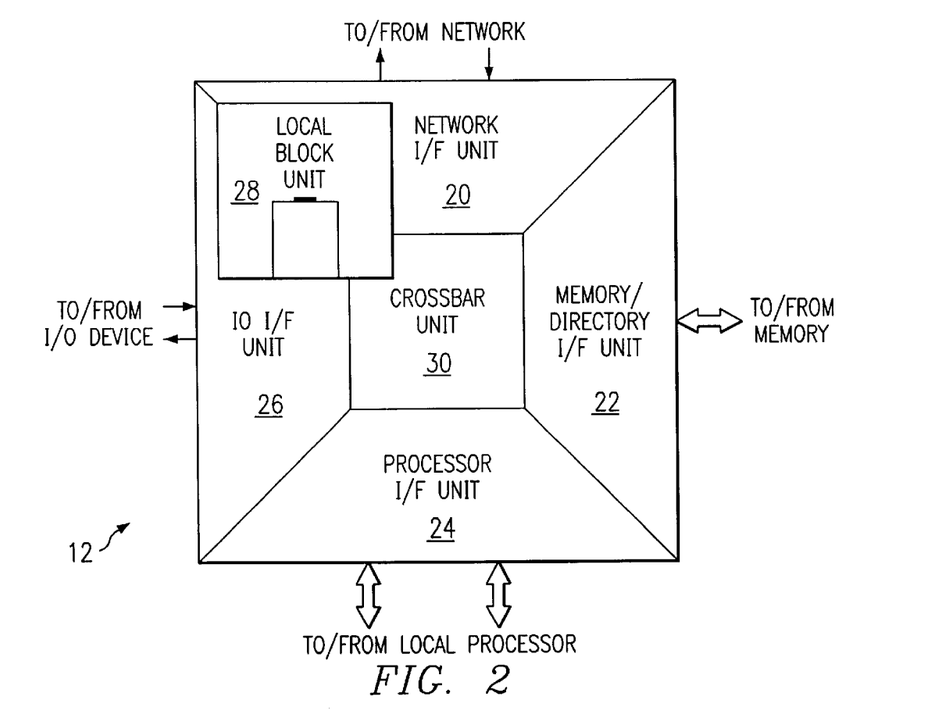
FIG. 2 illustrates a simplified block diagram of a node controller in the computer system.

FIG. 2 is a block diagram of the node controller 12. The node controller 12 includes a network interface unit 20, a memory directory interface unit 22, a processor interface unit 24, an input/output interface unit 26, a local block unit 28, and a crossbar unit 30. The network interface unit 20 may provide a communication link to the network 14 in order to transfer data, messages, and other traffic to other node controllers 12 in computer system 10. The processor interface unit 22 may provide a communication link with one or more local processors 16. The memory directory interface unit 22 may provide a communication link with one or more local memory devices 17. The input/output interface unit 26 may provide a communication link with one or more local input/output devices 18. The local block unit 28 is dedicated to processing invalidation requests and handling programmed input/output operations. The crossbar unit 30 arbitrates the transfer of data, messages, and other traffic for the node controller 12.

Figure 3:
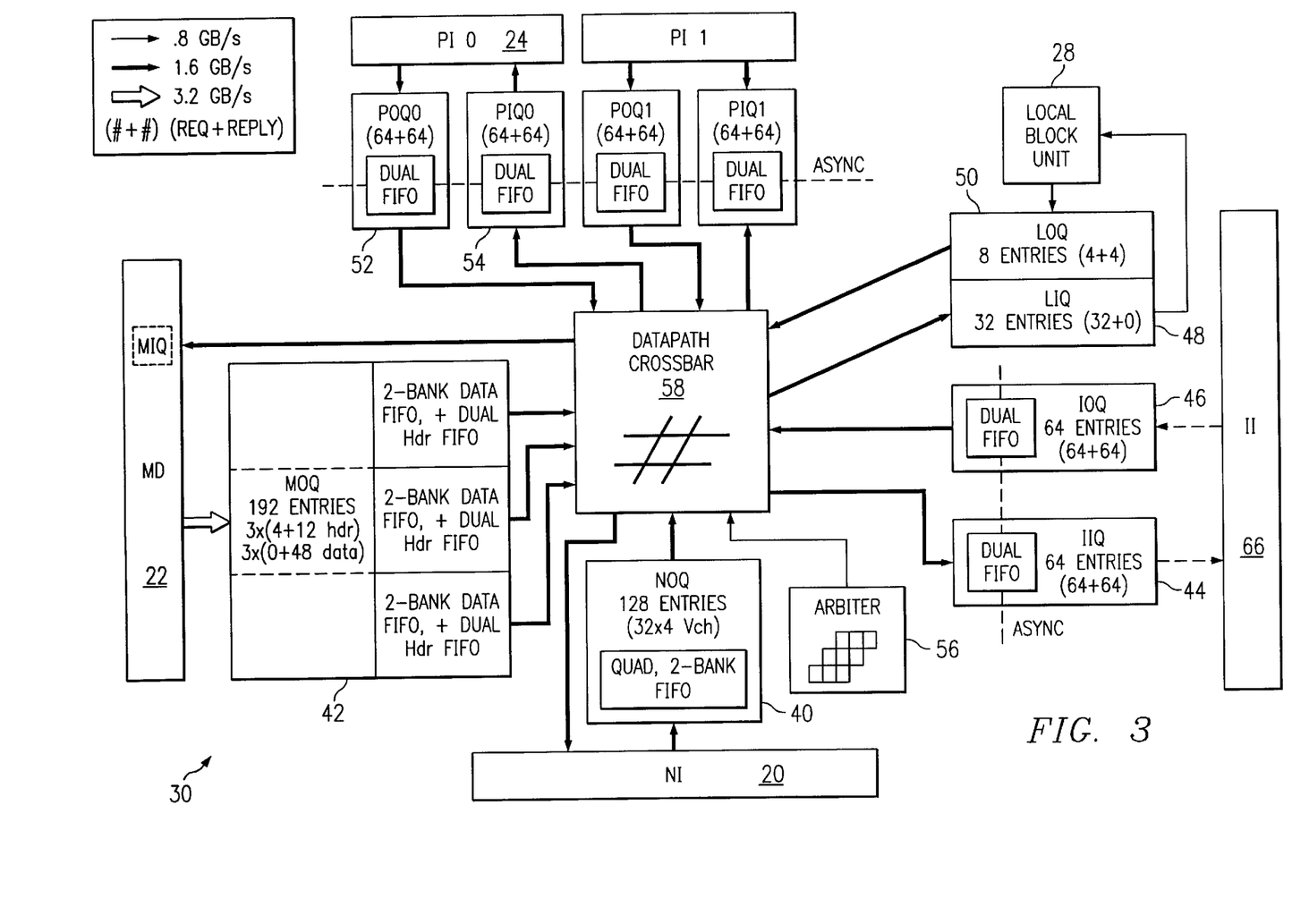
FIG. 3 illustrates a simplified block diagram of a crossbar unit in the node controller.

FIG. 3 is a block diagram of the crossbar unit 30. The crossbar unit 30 includes a network interface output queue 40, a memory output queue 42, an input/output input queue 44, an input/output output queue 46, a local block input queue 48, a local block output queue 50, a processor interface output queue 52, a processor interface input queue 54, an arbiter 56, and a datapath crossbar 58. The datapath crossbar 58 provides data, messages, and other traffic to the memory director interface unit 22 and the network interface unit 20. The datapath crossbar 58 also provides data, messages, and other traffic to the processor interface input queue 54 and the input/output input queue 44. The datapath crossbar 58 provides invalidation requests to the local block input queue 48 for processing by the local block unit 28. The datapath crossbar 58 receives invalidation messages from the local block output queue 50 as generated by the local block unit 28. The datapath crossbar 58 also receives data from the memory output queue 42 and data, messages, and other traffic from the input/output output queue 46. The datapath crossbar 58 also receives data, control messages, other traffic, and invalidation requests from the processor interface output queue 52 and the network interface output queue 40. The arbiter 56 determines the configuration of the datapath crossbar 58 in transferring data, control messages, other traffic, and invalidation requests among all queues within the crossbar unit 30 and units of the node controller 12.

Figure 4:
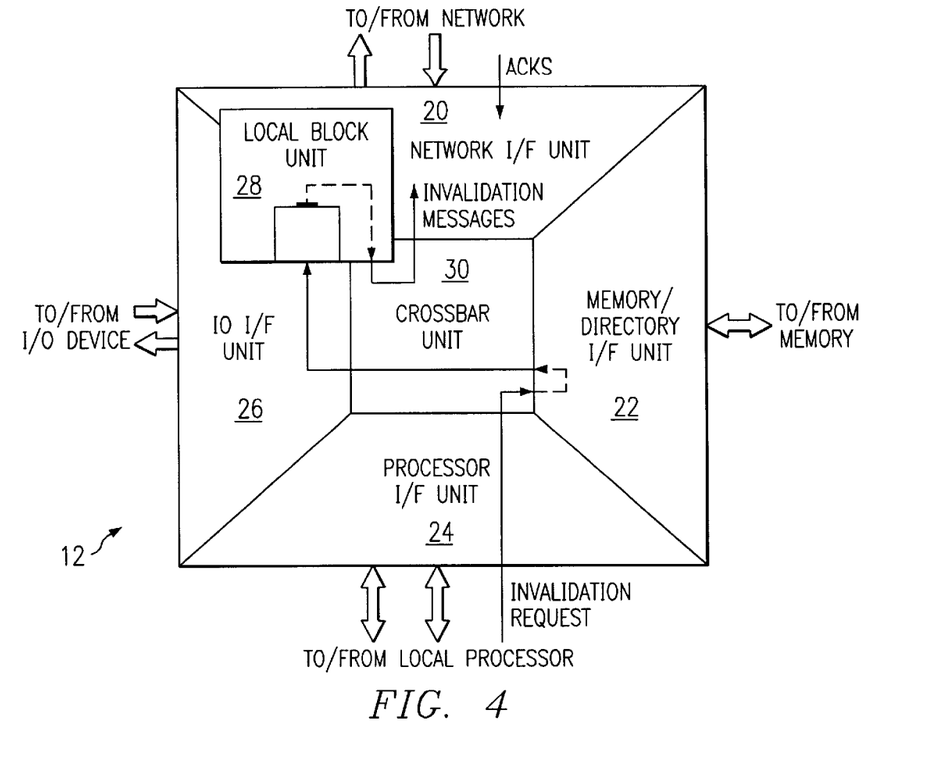
FIG. 4 illustrates the processing and broadcasting of invalidation messages in the node controller.

FIG. 4 shows how invalidation requests are processed by the node controller 12. The local processor 16 accesses a memory location within the local memory 18 through the memory directory interface unit 22 and the processor interface unit 24. If the local processor 16 alters the particular data at the accessed memory location of the local memory 17, the local processor 16 generates an invalidation request provided to the processor interface unit 26 for transfer to the memory directory interface unit 22. The memory directory interface unit 22 generates a compact form of the invalidation request that includes an identity list for all of the remote processors 16 of the remote node controllers 12 in computer system 10 that share the particular data being altered. The invalidation request is provided to the local block input queue 48 through the processor interface output queue 52 as transferred by the datapath crossbar 58 in the crossbar unit 30.

The local block unit 28 processes the invalidation request by generating an invalidation message for each remote processor 16 indicated within the invalidation request. The invalidation message notifies the remote processor 16 that its version of the particular data is no longer valid. The local block unit 28 provides the invalidation messages to the local block output queue 50 for transfer to the network interface unit 30 through the datapath crossbar 58 as determined by the arbiter 56. The arbiter 56 interleaves the invalidation messages with other traffic using any desired fairness algorithm to ensure that the node controller 12 continues to provide a robust operation capability. Acknowledgment messages are generated by each of the remote processors 16 upon receiving and processing its associated invalidation message. The acknowledgment messages are transferred to the local processor 16 that generated the invalidation request to indicate that the remote processor is aware that its version of the particular data is no longer valid.

In certain situations, various processors 16 may not be present within the computer system 10 or may be in an otherwise inoperable state. More problematic, when the computer system 10 utilizes multi-processor nodes and shared vector pointers, aliasing may exist. Alias processors are either actual or phantom processors that the system initially interprets as sharing a line of data as a result of the compression involved in representing, for example, 256 nodes in a twenty-six bit sharing vector. In other words, the local block unit 28 may initially identify processors needing invalidation messages that in reality may not exist, i.e., phantoms, or may not share the line of memory that has been altered.

Figure 5:
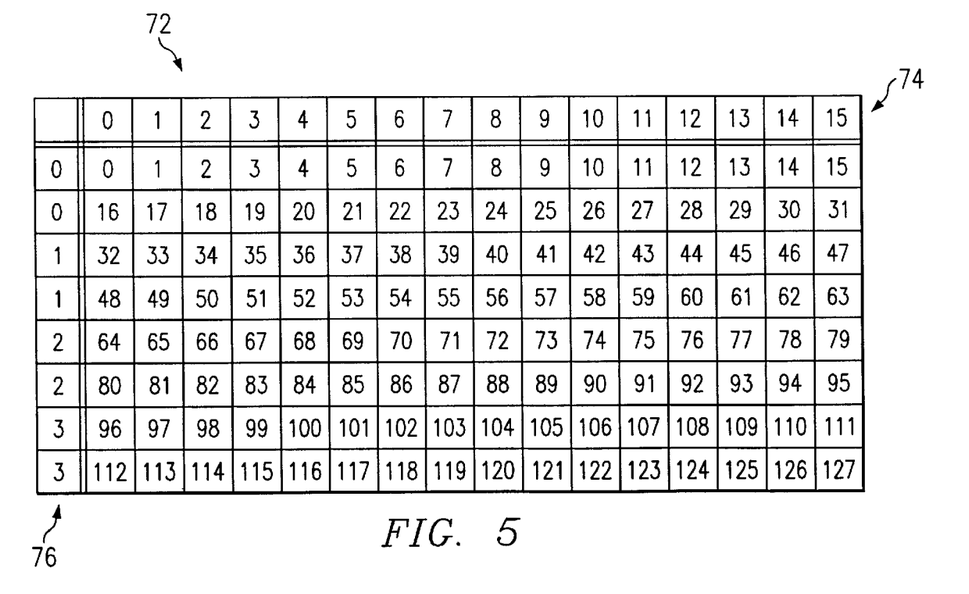
FIG. 5 illustrates an example of a vector matrix that may be used in conjunction with the present invention.
Figure 6:
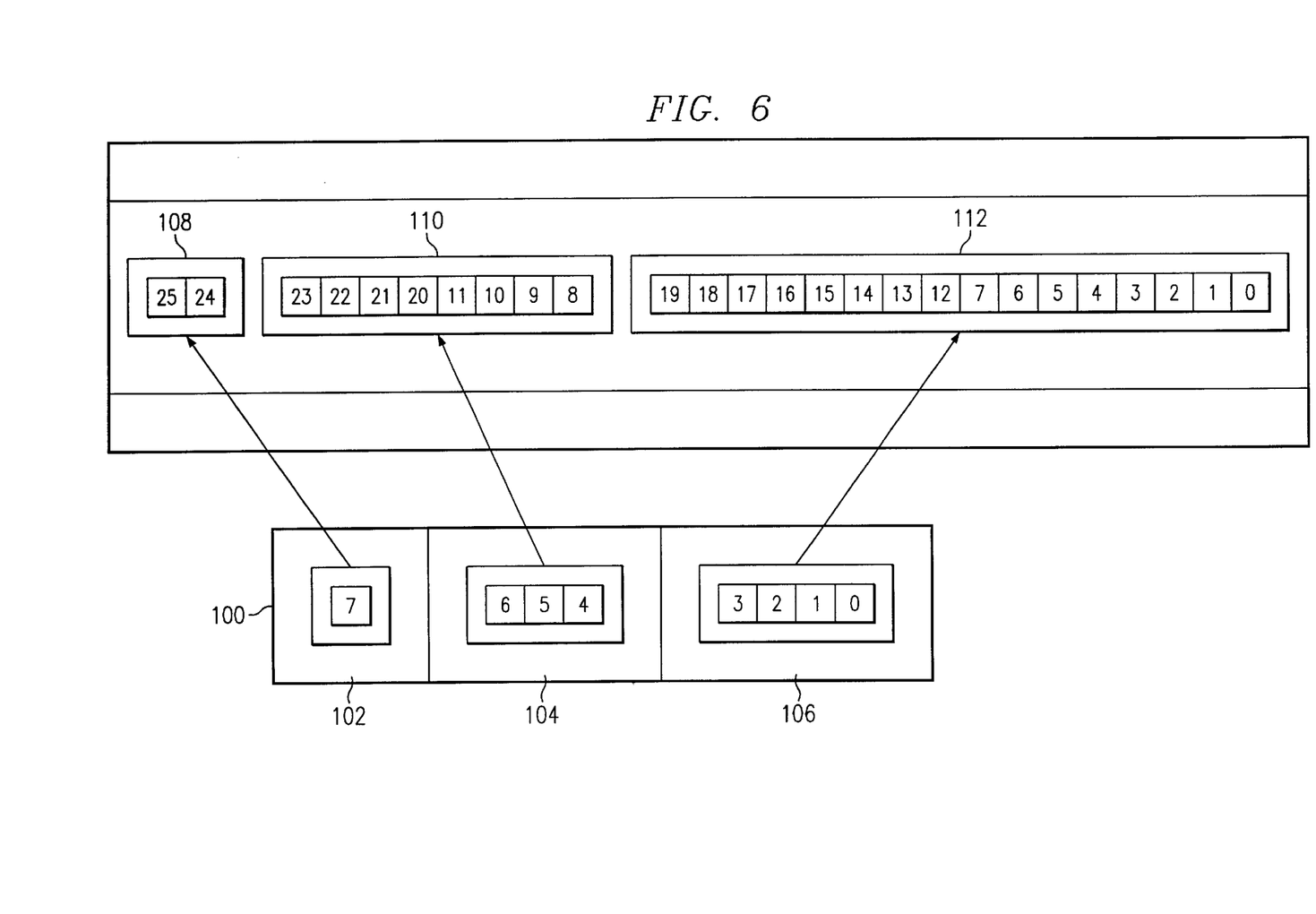
FIG. 6 illustrates an example of a three-dimensional sharing vector address and vectors.
Figure 7:
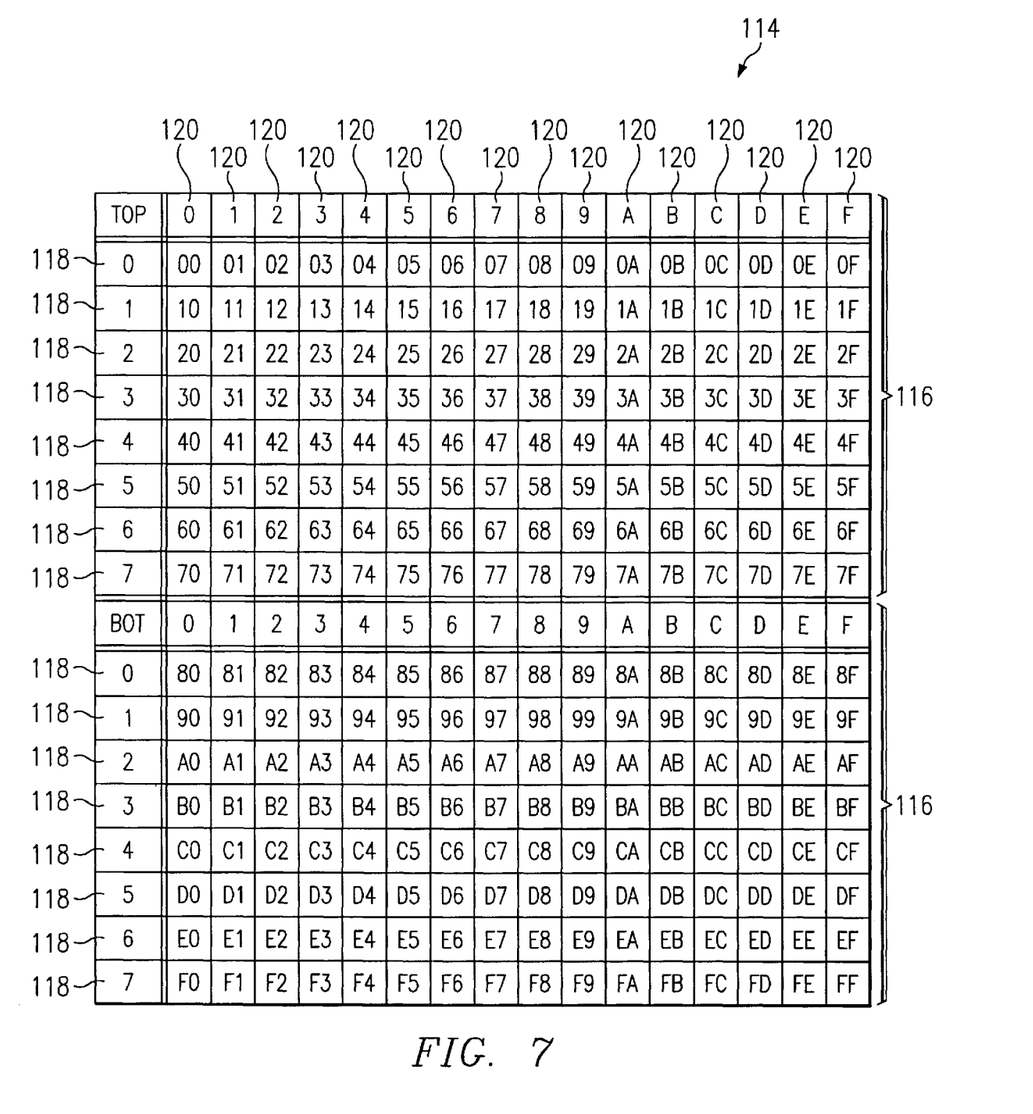
FIG. 7 illustrates the three-dimensional sharing vector matrix defined in FIG. 6

For example, FIG. 5 is a vector matrix 72 illustrating a 128-processor system using directory entries with a 16-bit row vector 74 and a 4-bit column vector 76. Here each bit in the column vector represents two 16-processor rows. When processors 16 represented by numbers 18 and 90 in the matrix 72 have cached a given line of memory, in the directory entry for this line, the row vector 74 will have bits 2 and 10 set. The column vector 76 will have bits 0 and 2 set. When the line is written to, invalidation messages will be sent to all processors 16 whose corresponding bits are set in the row and column vectors (i.e., processors represented by numbers 2, 10, 18, 26, 66, 82, 74 and 90 in the matrix 72). In this scenario, six spurious invalidations are sent in view of the alias processors (i.e., processors represented by numbers 2, 10, 26, 66, 82 and 74 in the matrix 72). The vector matrix 72 may be any size to accommodate any number of processors 16 within the computer system 10. Actual or operable processors may not be at each intersection in the matrix 72. An intersection that does not represent an actual or operable processor instead represents a phantom processor. Moreover, more than two bit vectors can be used. For example, as illustrated in FIG. 6, a vector address 100 can have three portions 102, 104, 106 of 1, 3 and 4 bits, respectively, representing three bit vectors, i.e., a 2-bit vector 108, an 8-bit vector 110 and a 16-bit vector 112. As shown in FIG. 7, the three vectors 108, 110, 112 define a three-dimensional vector matrix 114 having two planes 116, eight rows 118 and sixteen columns 120. Any of the 256 intersections of the three vectors that did not represent an actual processor, represents a phantom processor. For example, if locations 3A and ED in FIG. 7 did not have processors, locations 3A and ED represent phantom processors.

To accommodate for these situations, local block unit 28 sends out invalidation messages to a superset of processors 16 which at a minimum includes all the sharing processors, i.e., the processors 16 that actually share the line of memory that has been altered. The superset may include all processors 16 or any other superset of processors 16 that is sufficiently easily, efficiently and quickly calculable, as long as all actual processors with the altered data line are included. The superset may consist of the sharing processors and the alias processors. Concurrently, or substantially concurrently, the memory directory interface unit 22 determines or has determined the number $N_a$ of alias processors either directly, by calculating the difference between the total number of invalidation messages sent by the local block unit 28 and the number of actual sharing processors or by some other means. The memory directory interface unit 22 then provides a superacknowledgement message to the local block unit 28 which accounts for the number $N_a$ of spurious invalidation messages. The superacknowledgement message may be a number of individual acknowledgment messages corresponding to the count of the superacknowledgement. Thus, the combination of the acknowledgment messages from the sharing processors and the superacknowledgement message provided by the memory directory interface unit 22 allows for the full operation of the computer system to continue.

In this manner, the potential problem arising from the time for the system to determine the sharing processors in view of the complex sharing vector is avoided. The superset of invalidation messages are sent while the memory directory concurrently determines the number of alias processors thereby reducing the latency period from the time of the invalidation request to the receipt of all acknowledgments. Invalidation messages are only transmitted to processors that exist and are working and not to each possible processor so that there is no system down time waiting for acknowledgements from non-existing or non-working processors.

Thus, it is apparent that there has been provided, in accordance with the present invention, a method and system for using high count invalidate acknowledgements in distributed shared memory systems that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of handling invalidation requests to a plurality of alias processors not sharing a line of memory in a computer system, comprising:

receiving an invalidation request for a shared line of memory shared by a plurality of sharing processors;

determining a superset of processors in the computer system that includes each of the sharing processors and includes at least one alias processor not sharing the shared line of memory;

transmitting an invalidation message to each processor in the superset of processors;

determining the number $N_a$ of alias processors in the superset of processors; and providing a superacknowledgement message equivalent to acknowledging receipt of $N_a$ invalidation messages.

2. The method of handling invalidation requests according to claim 1 wherein the computer system is designed to include a maximum number M of processors and the number of processors in the superset of processors is less than the maximum number M.

3. The method of handling invalidation requests according to claim 2 wherein the alias processors include phantom processors.

4. The method of handling invalidation requests according to claim 1 further comprising receiving an acknowledgement message from each of the sharing processors.

5. The method of handling invalidation requests according to claim 1 wherein determining the number $N_a$ of alias processors in the superset of processors occurs subsequent to transmitting an invalidation message to each processor in the superset of processors.

6. The method of handling invalidation requests according to claim 1 wherein at least two bit-vectors are used to represent processors in a vector matrix in which identification of at least two of the sharing processors in the vector matrix causes the identification of at least one of the alias processors in the vector matrix and wherein the superset of processors is determined to be the sharing processors and alias processor identified in the vector matrix.

7. The method of handling invalidation requests according to claim 1 wherein the superacknowledgement message comprises a plurality of messages.

8. A system for handling invalidation requests to a plurality of alias processors not sharing a line of memory, comprising:

a memory directory interface unit operable to control access to and data manipulation for a memory; and a processor interface unit operable to generate an invalidation request in response to data manipulation in the memory, the processor interface unit operable to provide the invalidation request to the memory directory interface unit, the memory directory interface unit operable to indicate a superset of processors in the computer system that may be affected by the invalidation request and subsequently identify the number of alias processors included in the superset of processors, the memory directory interface unit operable to generate a superacknowledgement message acknowledging receipt of the number of invalidation messages transmitted to alias processors included in the superset of processors.

9. The system of claim 8 further comprising a local block unit operable to generate an invalidation message for the superset of processors.

10. The system of claim 9, wherein the local block unit transfers the invalidation messages to their respective processors, the processor interface unit operable to receive acknowledgment messages from the processors sharing the line of memory in response to processing of the associated invalidation message.

11. The system of claim 10, wherein the local block unit transfers the acknowledgment messages to the processor interface unit.

12. The system of claim 8, wherein at least two bit vectors are used to represent processors in a vector matrix in which identification of at least two of the sharing processors in the vector matrix causes the identification of at least one of the alias processors in the vector matrix and wherein the system is configured to set the superset of processors as the sharing processors and alias processor identified in the vector matrix.

13. The system of claim 8 wherein the system is configured to include a maximum number M of processors and the system is configured to set the number of processors in the superset of processors to be less than M.

14. The system of claim 13, wherein the at least two bit vectors includes a 2-bit vector, an 8-bit vector and a 16-bit vector defined by an 8-bit field operable to access 256 processor nodes identified in the vector matrix.

15. The system of claim 8 wherein the alias processors include phantom processors.

16. The system of claim 8 wherein the superacknowledgement message comprises a plurality of messages.

* * * * *